United States Patent
Dieterle

(10) Patent No.: US 7,278,403 B2
(45) Date of Patent: Oct. 9, 2007

(54) INTERNAL COMBUSTION ENGINE HAVING AT LEAST TWO CYLINDER BANKS

(75) Inventor: Frank Dieterle, Ditzingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/363,322

(22) Filed: Feb. 28, 2006

(65) Prior Publication Data

US 2006/0201457 A1 Sep. 14, 2006

(30) Foreign Application Priority Data

Mar. 1, 2005 (DE) .................... 10 2005 009 117

(51) Int. Cl.
F02M 55/02 (2006.01)
F02M 55/00 (2006.01)

(52) U.S. Cl. ..................... 123/468; 123/54.4

(58) Field of Classification Search ............... 123/54.4, 123/184.31, 456, 447, 468
See application file for complete search history.

(56) References Cited

U.S. PATENT DOCUMENTS

| | | | |
|---|---|---|---|
| 4,570,602 A * | 2/1986 | Atkins et al. ............... | 123/468 |
| 5,564,380 A * | 10/1996 | Kobayashi et al. ........ | 123/192.2 |
| 6,474,305 B1 * | 11/2002 | Kimura ....................... | 123/456 |
| 6,925,980 B2 * | 8/2005 | Glovatsky ............... | 123/184.21 |
| 2001/0029927 A1 * | 10/2001 | Kato ........................... | 123/456 |
| 2002/0083924 A1 | 7/2002 | Murphy | |
| 2002/0179025 A1 | 12/2002 | Glovatsky | |
| 2003/0140882 A1 * | 7/2003 | Lundgreen et al. ..... | 123/184.31 |

FOREIGN PATENT DOCUMENTS

| EP | 0 352 820 A2 | 1/1990 |
|---|---|---|
| EP | 0 405 612 A1 | 1/1991 |
| EP | 0 405 612 B1 | 1/1991 |
| EP | 0 892 170 A1 | 1/1999 |

OTHER PUBLICATIONS

European Search Report dated Jan. 16, 2006 (Five (5) pages).

* cited by examiner

*Primary Examiner*—Mahmoud Gimie
(74) *Attorney, Agent, or Firm*—Crowell & Moring LLP

(57) ABSTRACT

The invention relates to an internal-combustion engine having at least two cylinder bank rows, which are preferably oriented in a V-shape. An air intake system is arranged between two cylinder bank rows, and a fuel supply system is at least partially arranged below the air intake system. A central supply line is provided for the fuel supply, from whose two longitudinal sides individual fuel lines are branched off and connected to fuel injectors fastened in the cylinder head.

7 Claims, 3 Drawing Sheets

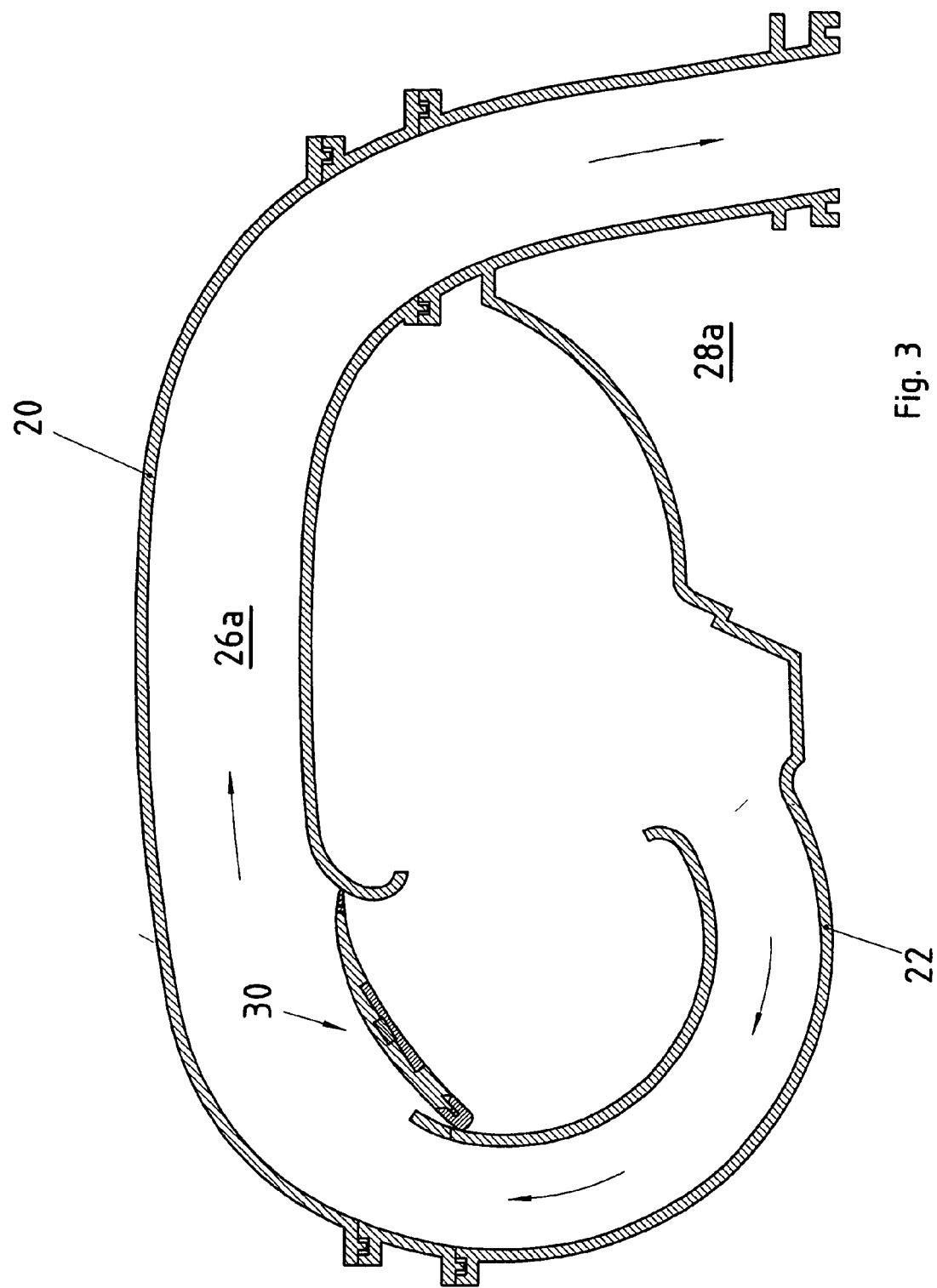

INTERNAL COMBUSTION ENGINE HAVING AT LEAST TWO CYLINDER BANKS

BACKGROUND AND SUMMARY OF THE INVENTION

This application claims the priority of German patent document 10 2005 009 117.2, filed Mar. 1, 2005, the disclosure of which is expressly incorporated by reference herein.

The invention relates to an internal combustion engine having at least two cylinder rows, or banks.

European Patent Document EP 0 405 612 B1 discloses an internal-combustion engine which has cylinders mutually arranged in a V-shape, with corresponding fuel injectors being fastened to the cylinder heads on the inner side of the V. A centrally disposed air intake module extends above this arrangement.

One object of the present invention is to provide an internal combustion engine with common-rail injection, in which the fuel supply device as a whole is integrated on or in the internal-combustion engine, in a space-saving manner.

This and other objects and advantages are achieved by the internal combustion engine according to the invention, in which the central fuel supply line (common rail) is centrally arranged below the air intake system of the internal-combustion engine. In this case, individual lines are branched off from the two longitudinal sides of the common rail, and are connected to injectors fastened in the cylinder head. As a result, with the exception of the high-pressure pump, the high-pressure supply unit for the fuel is arranged completely within the V and is protected from outside damage. In addition, the acoustically normally noticeable injection valves can be shielded by the air intake system.

According to the invention, the modularly constructed air intake system has a shell-shaped construction, with recesses formed in a bottom shell on its underside, in which recesses individual fuel lines are accommodated in a space-saving manner.

In addition to top and bottom shells, the air intake system has a center part arranged in-between, in which, in the assembled condition, air intake ducts for the individual cylinders are formed.

Other objects, advantages and novel features of the present invention will become apparent from the following detailed description of the invention when considered in conjunction with the accompanying drawings.

BRIEF DESCRIPTION OF THE DRAWINGS

FIG. 3 is a cross-sectional view of an air intake system.

DETAILED DESCRIPTION OF THE DRAWINGS

Figure 1:
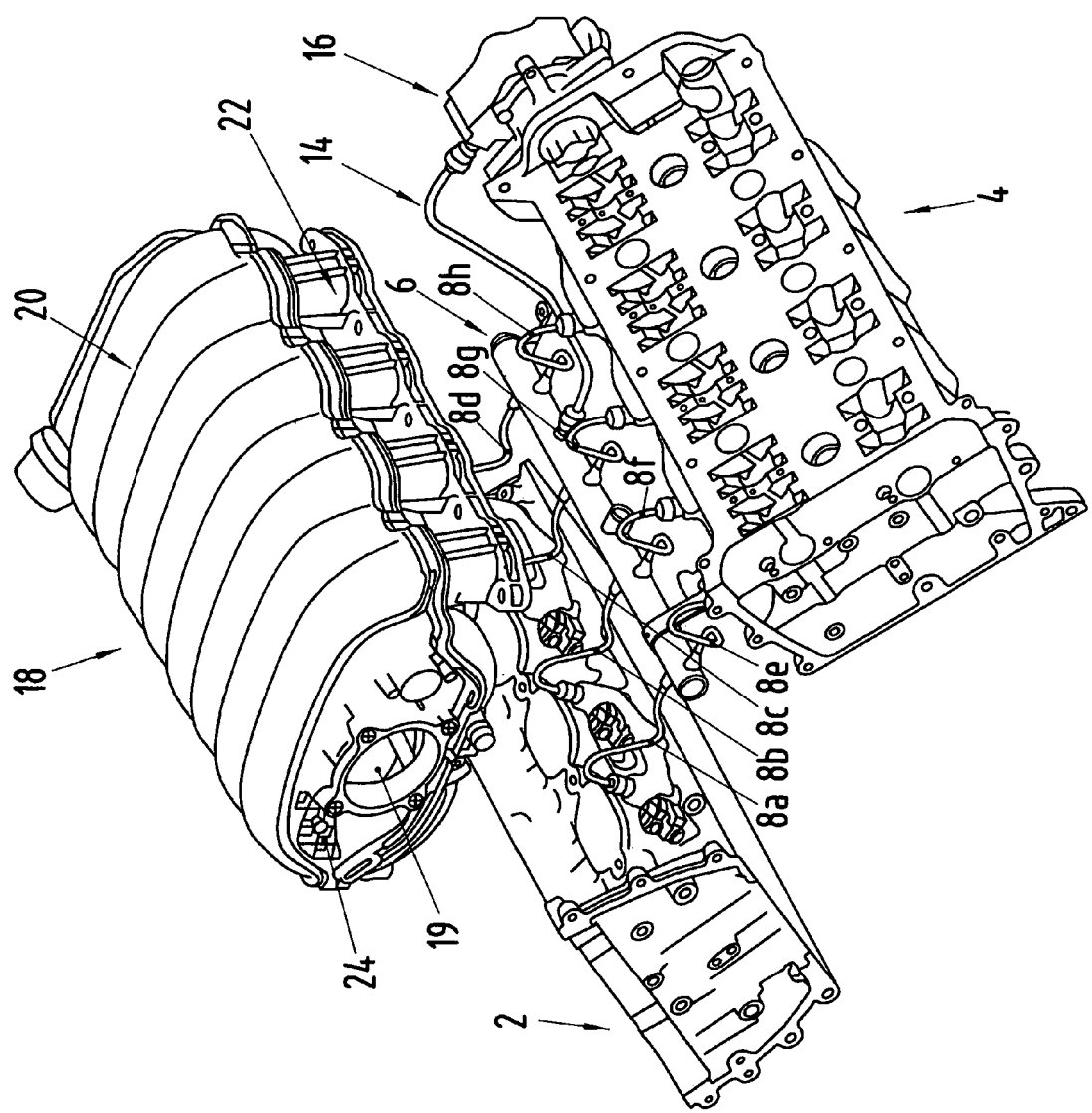
FIG. 1 is a perspective view of a part of an internal-combustion engine.
Figure 2:
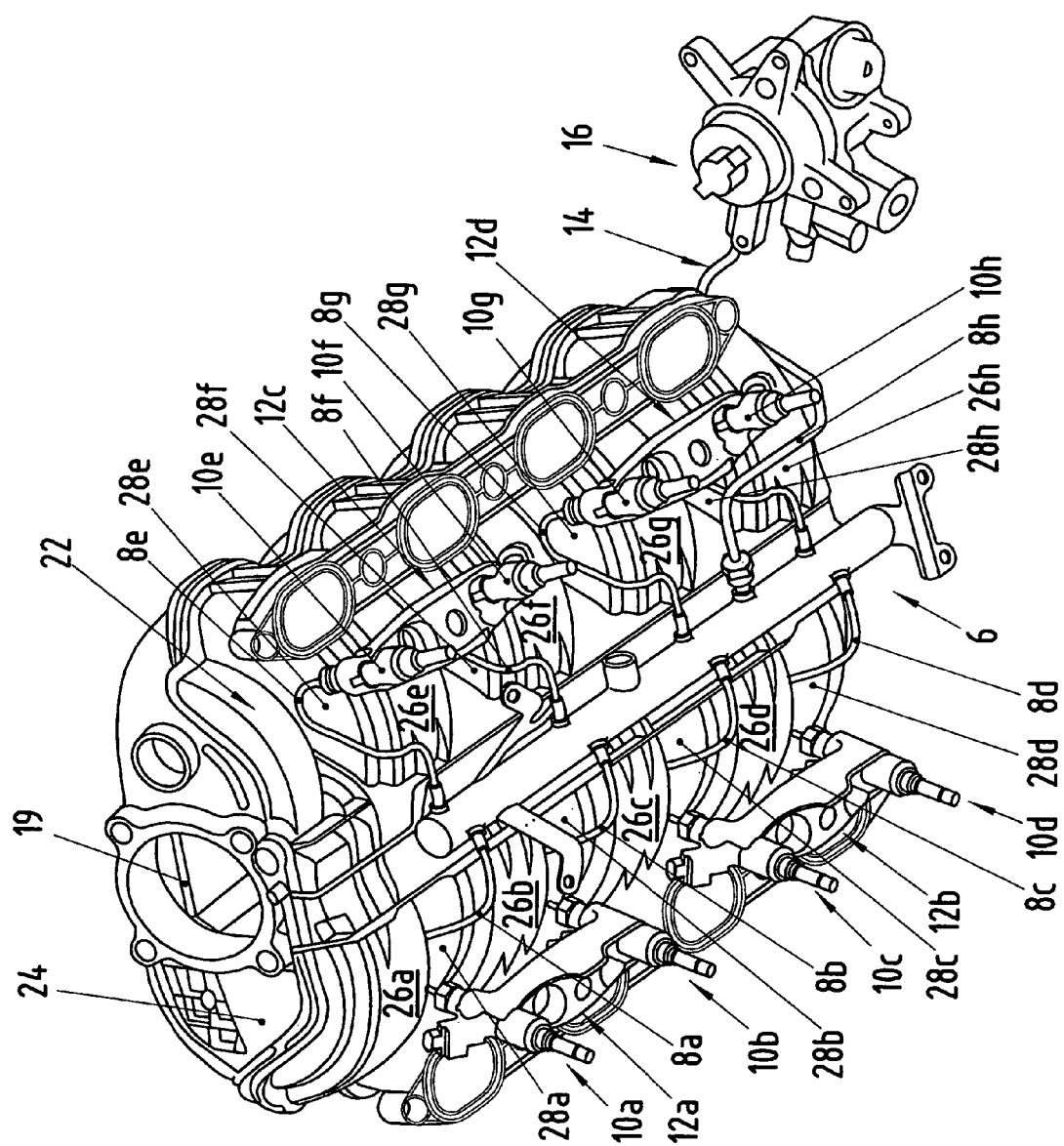
FIG. 2 is a view from below of a fuel supply system of the internal-combustion engine.

FIG. 1 illustrates the parts of an internal-combustion engine that are necessary to explain the invention. The internal-combustion engine is constructed, for example, in a V8-configuration, and correspondingly has two cylinder heads 2 and 4. A central fuel supply line 6 (hereinafter referred to as a "common rail") is arranged between the two cylinder heads 2 and 4, within the V of the engine. Individual fuel lines 8a to 8h, each of which each leads to a fuel injector 10a to 10h fastened in the cylinder heads 2, 4, branch off from the two longitudinal sides of the common rail 6. In this case, the fuel injectors 10a to 10h are fastened in pairs by means of a hold-down device 12a to 12d (FIG. 2), in the cylinder head. A fuel supply line 14, which is connected to a high pressure fuel pump 16, is fastened to the common rail 6. The high-pressure pump 16 is fastened on its face side to the cylinder head 4, and is driven by way of a camshaft (not shown).

Above the fuel supply system consisting of the common rail 6 and of the fuel injectors 10a to 10h, an air intake system 18 (referred to herein as an "air intake module") is arranged between the two cylinder banks. (See FIGS. 1 and 2.) Combustion air is taken in in a known manner via a central opening 20, to which a throttle valve housing is fastened (not shown), and is fed to the individual cylinders via air intake ducts constructed in the air intake module 18. The air intake module 18 is constructed in three parts, including a top shell 20 and a bottom shell 22, between which a center part 24 is arranged. In the assembled state, the three parts 20, 22 and 24 form corresponding air intake ducts 26a to 26h. Recesses 28a to 28h, in which the individual fuel lines 8a to 8h extend or are received, are formed in the bottom shell 22 between the air intake ducts 26a to 26h.

As illustrated by a sectional view of the air intake module 18 (see FIG. 3), the air intake ducts 26a to 26h extend in a spiral shape and have corresponding switching flaps 30, by which, as a function of the rotational engine speed, two different suction pipe lengths can be provided. In the closed position (see FIG. 3), the long suction pipe is switched, while, when the switching flap 30 is open, the combustion air reaches the individual cylinders by way of the unblocked opening.

The formation of corresponding free spaces or recesses 28a to 28h for accommodating the injectors 10a to 10h and the individual fuel lines 8a to 8h in the bottom shell 22, permits the air intake ducts 26a to 26h to be provided with maximal radii and minimal flow losses, because they extend laterally past the injectors 10a to 10h.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An internal combustion engine having at least two cylinder banks oriented in a V-shape, an air intake system arranged between the two cylinder banks, and a fuel supply system which is at least partially arranged below the air intake system, wherein:

a central fuel supply line is provided;

individual fuel lines branch off from longitudinal sides of the central fuel supply lines and extend at least partially in recesses formed on an underside of the air intake system; and the individual fuel lines are connected to fuel injectors fastened in the cylinder head.

2. The internal combustion engine according to claim 1, wherein the air intake system has a bottom shell in which the recesses are formed.

3. The internal combustion engine according to claim 2, wherein:

the air intake system comprises a top shell, a bottom shell, and a center part formed between the top and bottom shells; and air intake ducts for the individual cylinders are formed in the bottom shell in the assembled condition.

4. An internal combustion engine having first and second cylinder banks arranged in a V configuration, a fuel supply system and an air intake system; wherein:

the air intake system is positioned between the cylinder banks; and a central supply line in the form of a common rail, and individual fuel lines which branch from the common rail and are connected to each cylinder, are arranged entirely in a space which is between the cylinder banks within the V configuration, and is enclosed by the air intake system.

5. The internal combustion engine according to claim 4, wherein:

the common rail extends longitudinally in said space within said V configuration of the cylinder banks; and the individual fuel lines are routed to the respective cylinders through recesses formed in a bottom surface of the air intake system.

6. The internal combustion engine according to claim 5, wherein said recesses are formed between laterally extending air intake ducts of said air intake system.

7. An internal combustion engine having first and second cylinder banks arranged in a V configuration, a fuel supply system and an air intake system; wherein:

the air intake system is positioned between the cylinder banks;

the air intake system comprises a plurality of laterally extending air intake ducts formed therein, for supplying air to respective cylinders in the cylinder banks; and a bottom surface of the air intake system has recesses formed between said air intake ducts, for accommodating individual fuel supply lines of the fuel supply system, which individual fuel supply lines are connected to the respective cylinders in the cylinder banks.

\* \* \* \* \*